United States Patent Office 2,708,624
Patented May 17, 1955

2,708,624

METHOD OF TREATING PLANTS

Frank Earl Denny, Yonkers, N. Y., assignor to Boyce Thompson Institute for Plant Research, Inc., a corporation of New York No Drawing. Application August 21, 1952,
Serial No. 305,694

4 Claims. (Cl. 71—2.6)

This invention relates to the control of plant growth and, more particularly, to the application of certain organic compounds to plants to control the growth of new tissue. The invention is applicable to the treatment of such storage organs as tubers, roots and bulbs, and woody plants, grasses, and related plants, during dormancy or as the new tissue emerges from dormancy.

I have discovered a class of phenolic ether compounds that have the specific property of delaying or inhibiting the growth of new plant tissue, and my invention provides an improved method of delaying the growth of such new tissue by contacting the plants with one of the compounds. The compounds which I use in carrying out the method of my invention are phenolic ethers of the group consisting of p-bromo-diphenyl ether, γ-bromopropyl phenyl ether, o-nitroanisole, o-nitrophenetole, ethyl anisate, and iso-eugenol methyl ether.

The compounds may be applied to the plants in dispersed or diluted forms such as vapors, sprays, or dusts, and the like.

In carrying out a method of the invention in the treatment of tubers, such as potatoes for example, one or more of the compounds may be applied to the potatoes during dormancy in such a manner that the potatoes may be stored for relatively long periods without sprouting, or they may be applied in such manner as to retard sprouting only until the end of a desired dormant period, leaving the tubers at the end of the period in condition for sprouting as would be desirable in the case of tubers intended for planting stock.

In applying the growth regulants to storage organs, a very effective and presently preferred method is to place the storage organs in a confined space such as a bag, box, barrel, or room, and place therein a growth regulant compound of the aforementioned group in such manner and under such conditions that the vapors contact the storage organs. The compound may be incorporated in pieces of paper or other fibrous carrier material, or mixed with inert powder such as talc or other carrier media, and the same placed in the container whereby the resulting vapors permeate the container and contact the storage organs. In the case of large containers, such as warehouses, the compound may be vaporized by heating and the air laden vapors circulated with fans to effect a suitable contact with the storage organs. Mists of the compounds may also be used. The storage organs may be coated with solutions, emulsions, or powdered carriers of the compounds. It is usually advisable to permit a sufficient entrance of oxygen, preferably in the form of air, to the container to supply the oxygen needed for respiration.

In the treatment of potatoes, the maximum amount of compound needed to retard sprouting is about 1 gram for each kilogram of potatoes. Good results have been obtained, however, with from 1/10 to 1/2 of that amount.

In the application of the invention to woody plants, I may, for example, apply certain of the compounds to the twigs early in the spring, more especially during dormancy, and bring about a retardation of the opening of the buds for a short period, say, from 5 to 20 days. At the end of that period the buds open and continue development in a normal or near normal rate. In other words, in accordance with the method of my invention, I may delay the budding without serious injury, if any, to the buds and then permit normal development to occur.

The compounds may be applied to the woody plants as vapors, sprays, or dusts. Solutions of the compounds in water or organic solvents such as acetone may be applied to the plants as sprays or the plants may be dipped in such solutions.

In the application of the invention to daffodils or hyacinths for example, one or more of the compounds may be applied to the young plants just as they appear above the soil following a very mild winter, to hold back leaf development and thus allow flower stalk development to proceed at a relatively greater rate.

Various other plants, notably the grasses used in lawns, may be treated to retard the growth, advantageously in the manner described for woody plants. The compounds may be applied to the old tissue or to the new tissue to control the growth of the new tissue.

The following are examples illustrating methods carried out in accordance with the invention in which the potatoes were immersed in solutions of the compounds during October and the sprouting in soil was determined during the following January:

| Compound Used | Gram of Compound per kg. of Potato | Solvent for Compound | Effect on Bud Growth | Sprouting when Planted in Soil, Percent |
|---|---|---|---|---|
| p-bromodiphenyl ether | 1.0 | Acetone | Inhibited completely | 80.0 |
| Do | 0.5 | do | Inhibited almost completely (a few small sprouts) | 85.0 |
| γ-bromopropyphenyl ether | 1.0 | do | Inhibited completely | 60.0 |
| Do | 0.5 | do | Inhibited almost completely | 60.0 |
| Iso-eugenol methyl ether | 1.0 | do | Inhibited—slight injury | 70.0 |
| Do | 0.5 | do | Inhibited | 80.0 |

One and three per cent solutions of each of the compounds of the invention were applied to the buds of althaea cuttings and the cut ends were immersed in water. In each instance, the buds were retarded in comparison with control cutting not treated with the compounds.

This application is a continuation-in-part of my application Serial Number 95,385, filed May 25, 1949, and now abandoned.

I claim:

1. The method of retarding the growth of plants which comprises contacting the plant while in at least a partial dormant state with a compound of the group consisting of p-bromodiphenyl ether, γ-bromopropyl phenyl ether, o-nitroanisole, o-nitrophenetole, ethyl anisate, and isoeugenol methyl ether in such concentration that the growth of the plants is effectively retarded.

2. The method of retarding the sprouting of tubers and bulbs which comprises contacting the tubers and bulbs while in a dormant state with from 0.1 to 1.0 g. per kg. of tubers of a compound of the group consisting of p-bromodiphenyl ether, γ-bromopropyl phenyl ether, o-nitroanisole, o-nitrophenetole, ethyl anisate, and isoeugenol methyl ether.

3. In the method of claim 1, applying the compound while in a dispersed form.

4. In the method of claim 2, applying the compound while in a dispersed form.

References Cited in the file of this patent

UNITED STATES PATENTS 2,394,916   Jones _____ Feb. 12, 1946

OTHER REFERENCES

Proc. Amer. Soc. Horticultural Science, vol. 35 (1938), pages 438 to 442.